United States Patent
Xiong et al.

(10) Patent No.: US 11,655,401 B2
(45) Date of Patent: May 23, 2023

(54) BUTYL RUBBER REACTIVE BONDING LAYER FOR PRE-PAVING REACTIVE-BONDING WATERPROOFING COILED MATERIAL, PREPARATION METHOD THEREOF, AND PRE-PAVING REACTIVE-BONDING WATERPROOFING COILED MATERIAL

(71) Applicant: BEIJING ORIENTAL YUHONG WATERPROOF TECHNOLOGY CO., LTD., Beijing (CN)

(72) Inventors: Yuqin Xiong, Beijing (CN); Ning Yang, Beijing (CN); Ning Tan, Beijing (CN); Yang Liu, Beijing (CN)

(73) Assignee: BEIJING ORIENTAL YUHONG WATERPROOF TECHNOLOGY CO., LTD., Beijing (CN)

( * ) Notice: Subject to any disclaimer, the term of this patent is extended or adjusted under 35 U.S.C. 154(b) by 572 days.

(21) Appl. No.: 16/646,400

(22) PCT Filed: Dec. 28, 2017

(86) PCT No.: PCT/CN2017/119438
§ 371 (c)(1),
(2) Date: Mar. 11, 2020

(87) PCT Pub. No.: WO2019/052088
PCT Pub. Date: Mar. 21, 2019

(65) Prior Publication Data
US 2020/0270489 A1  Aug. 27, 2020

(30) Foreign Application Priority Data

Sep. 12, 2017  (CN) .......................... 201710821890.6

(51) Int. Cl.
| | | |
|---|---|---|
| *C09J 11/04* | (2006.01) | |
| *C09J 11/06* | (2006.01) | |
| *C09J 11/08* | (2006.01) | |
| *C09J 123/22* | (2006.01) | |
| *C09J 123/28* | (2006.01) | |
| *B32B 7/10* | (2006.01) | |
| *B32B 7/12* | (2006.01) | |
| *C08L 61/14* | (2006.01) | |
| *C08K 3/22* | (2006.01) | |
| *C08K 3/36* | (2006.01) | |

(52) U.S. Cl.
CPC .............. *C09J 123/22* (2013.01); *B32B 7/10* (2013.01); *B32B 7/12* (2013.01); *C08L 61/14* (2013.01); *C09J 11/04* (2013.01); *C09J 11/06* (2013.01); *C09J 11/08* (2013.01); *C08K 3/22* (2013.01); *C08K 3/36* (2013.01); *C08K 2003/2227* (2013.01); *C09J 2301/408* (2020.08)

(58) Field of Classification Search
None
See application file for complete search history.

(56) References Cited

U.S. PATENT DOCUMENTS

2004/0241434 A1* 12/2004 Yamaguchi ................ C09J 7/38
428/354

FOREIGN PATENT DOCUMENTS

| CN | 103088846 A | 5/2013 |
|---|---|---|
| CN | 103102843 A | 5/2013 |
| CN | 103112220 A | 5/2013 |
| CN | 103113834 A | 5/2013 |
| CN | 106243537 A | 12/2016 |
| CN | 106700988 A | 5/2017 |
| CN | 107603519 A | 1/2018 |
| KR | 10-0957621 B1 | 5/2010 |
| KR | 10-2013-0033706 A | 4/2013 |

OTHER PUBLICATIONS

International Search Report, issued in PCT/CN2017/119438, dated Jun. 8, 2018.
Chinese Office Action for Chinese Application No. 201710821890. 6, dated Jul. 8, 2020, with an English translation.
English translation of the Chinese Office Action for Chinese Application No. 201710821890.6, dated Mar. 2, 2020.
English translation of the Chinese Search Report for Chinese Application No. 201710821890.6, dated Feb. 19, 2020.
English translation of the Written Opinion of the International Searching Authority for International Application No. PCT/CN2017/ 119438, dated Jun. 8, 2018.
European Annex to the Communication for European Application No. 17925520.3, dated Jul. 3, 2020.
European Communication under Rule 71(3) EPC for European Application No. 17925520.3, dated Dec. 7, 2020.
Singapore Office Action and Search Report for Singaporean Application No. 11202002201X, dated Apr. 20, 2021.
Singapore Office Action for Singaporean Application No. 11202002201X, dated Feb. 18, 2022.

* cited by examiner

*Primary Examiner* — Sheeba Ahmed
(74) *Attorney, Agent, or Firm* — Birch, Stewart, Kolasch & Birch, LLP

(57) ABSTRACT

A butyl rubber reactive bonding layer for a pre-applied reactive-bonding waterproofing coiled material, a preparation method therefor, and a pre-applied reactive-bonding waterproofing coiled material, relating to the technical field of high-molecular pre-applied materials, are disclosed. The butyl rubber reactive bonding layer is prepared mainly from the following raw materials: 100 parts of a raw rubber, 9.5-15.5 parts of a linear tackifier containing a terminal hydroxyl structure and 12.5-19.5 parts of an active filler. The active filler includes active silicon dioxide and aluminium oxide.

20 Claims, 1 Drawing Sheet

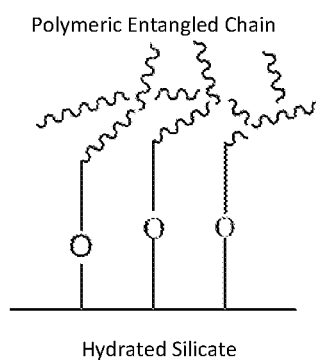

BUTYL RUBBER REACTIVE BONDING LAYER FOR PRE-PAVING REACTIVE-BONDING WATERPROOFING COILED MATERIAL, PREPARATION METHOD THEREOF, AND PRE-PAVING REACTIVE-BONDING WATERPROOFING COILED MATERIAL

CROSS-REFERENCE TO RELATED APPLICATIONS

This application claims priority to Chinese Patent Application No. 201710821890.6, filed with the Chinese Patent Office on Sep. 12, 2017, entitled "Butyl Rubber Reactive Bonding Layer for Pre-paving Reactive-bonding Waterproofing Coiled Material, Preparation Method Thereof, and Pre-paving Reactive-bonding Waterproofing Coiled Material", which is incorporated herein by reference in its entirety.

TECHNICAL FIELD

The present disclosure relates to the technical field of pre-applied polymeric materials, and in particular to a butyl rubber reactive bonding layer for a pre-applied (pre-paving) reactive bonding waterproofing coiled material (or membrane), a method for preparing the same, and a pre-applied reactive bonding waterproofing coiled material.

BACKGROUND ART

Waterproofing of structures is a measure taken in the construction of walls, roofs, tunnels, highways, underground garages, residential buildings and the like, to block seepage of rainwater from outside and seepage of groundwater, which is the first barrier for the entire construction and the building and plays a vital role in the entire construction.

Polymeric pre-applied reactive bonding waterproofing coiled materials are suitable for waterproofing of basements, reservoirs, roofs, rooms, and exterior walls of various civil and industrial buildings. In addition, such materials can also be used for anti-seepage and anti-leakage in various sewage treatment plants, swimming pools and the like, and for waterproofing and anti-seepage in various underground engineering structures, such as subways, tunnels, basements, civil air defense engineering structures, etc. The reactive bonding coiled material is a functional coiled material specially intended for sealing and waterproofing of concrete members, which can synchronously react with cement gel or cast-in-situ concrete and can be firmly bonded to concrete through the synergistic effect of chemical crosslinking and physical mortise and tenon connection, which has large, durable, and irreversible bonding strength that is less affected by environmental factors, and which can form a firm and irreversible interface-sealing reaction layer on the concrete matrix layer, so that the dual waterproofing effects can be achieved by the coating and by the coiled material. Such materials have the advantage that such materials can be permanently bonded with the solidified post-cast concrete, so as to effectively prevent water from flowing between the waterproofing material and the concrete when seepage occurs.

At the present stage, the adhesive (or bonding) layers of the polymeric waterproofing coiled materials commonly used in underground structures are mostly hot-melt pressure-sensitive adhesive systems, which are characterized by tending to flow, deform, and wrinkle when exposed to heat, and tending to be embrittled at low temperature. Moreover, the adhesive layer must have a single anti-sticking layer or isolation layer so that the adhesive layer will be non-sticky to facilitate construction, and can be bonded with the solidified concrete. The adhesive layer has low peel strength from the post-cast concrete. Also, a small number of the reactive bonding layers are black butyl rubber layers from which water leakage points cannot be easily identified. These problems limit the construction fields to which the pre-applied reactive bonding coiled materials are applicable.

In view of this, the present disclosure is particularly proposed.

SUMMARY

A first object of the present disclosure is to provide a butyl rubber reactive bonding layer for a pre-applied reactive bonding waterproofing coiled material. The butyl rubber reactive bonding layer comprises a linear tackifier containing a hydroxyl-terminated structure and an active filler as main constituents with chemical reactive bonding activity, which chemically react with concrete to form permanent chemical bonds, so as to ensure the formation of a real skin-type waterproofing structure between the pre-applied polymeric waterproofing coiled material and the concrete. The butyl rubber reactive bonding layer is not sticky and allows people to walk thereon without being covered with sand and coating layers, and the butyl rubber reactive bonding layer has good low-temperature resistance and thermal stability, and does not flow, deform, and wrinkle at high temperature.

A second object of the present disclosure is to provide a method for preparing a butyl rubber reactive bonding layer for a pre-applied reactive bonding waterproofing coiled material. In the method, a butyl rubber reactive bonding layer is obtained by blending, banburying, and molding. The process is simple and suitable for batch processing and production.

A third object of the present disclosure is to provide a pre-applied reactive bonding waterproofing coiled material, comprising the butyl rubber reactive bonding layer and a base film, which has the same advantages as the butyl rubber reactive bonding layer.

In order to achieve the above objects of the present disclosure, the following technical solutions are particularly used.

In a first aspect, a butyl rubber reactive bonding layer for a pre-applied reactive bonding waterproofing coiled material is provided, which is prepared mainly from the following raw materials in parts by weight: 100 parts of raw rubber, 9.5 to 15.5 parts of a linear tackifier containing a hydroxyl-terminated structure, and 12.5 to 19.5 parts of an active filler; wherein the active filler comprises active silica and active alumina as constituents.

Preferably, on the basis of the technical solution according to the present disclosure, the butyl rubber reactive bonding layer for a pre-applied reactive bonding waterproofing coiled material is prepared mainly from the following raw materials in parts by weight: 100 parts of raw rubber, 11 to 15.5 parts of a linear tackifier containing a hydroxyl-terminated structure, and 15 to 19.5 parts of an activity filler;

preferably, the butyl rubber reactive bonding layer for a pre-applied reactive bonding waterproofing coiled material is prepared mainly from the following raw materials in parts by weight: 100 parts of raw rubber, 13 to 15.5 parts of a linear tackifier containing a hydroxyl-terminated structure, and 18 to 19.5 parts of an active filler.

Preferably, on the basis of the technical solution according to the present disclosure, the linear tackifier containing a hydroxyl-terminated structure is an unmodified or modified linear phenolic resin;

preferably, the modified linear phenolic resin is one or more of a rosin-modified linear phenolic resin, a polyamide-modified linear phenolic resin, an epoxy-modified linear phenolic resin, an organosilicon-modified linear phenolic resin, and a furan-modified linear phenolic resin.

Preferably, on the basis of the technical solution according to the present disclosure, the active filler comprises bauxite, sodium carbonate, quicklime, fly ash, and calcined kaolin; wherein the total weight of bauxite, sodium carbonate, quicklime, and fly ash accounts for 65% to 75% of the weight of the active filler, and the weight of calcined kaolin accounts for 20% to 34% of the weight of the active filler.

Further, on the basis of the technical solution according to the present disclosure, the raw materials of the butyl rubber reactive bonding layer for a pre-applied reactive bonding waterproofing coiled material further comprise: 1 to 5.5 parts by weight of a terpene resin and/or 5 to 10 parts by weight of a hydrocarbon resin.

Further, on the basis of the technical solution according to the present disclosure, the raw materials of the butyl rubber reactive bonding layer for a pre-applied reactive bonding waterproofing coiled material further comprise: 10 to 30 parts by weight of a processing aid, 2 to 8 parts by weight of an inorganic dye, 1 to 3 parts by weight of an anti-aging agent, 1 to 3 parts by weight of an ultraviolet absorber, 0.5 to 2 parts by weight of a crosslinking agent, and/or 1 to 3 parts by weight of a reaction-active auxiliary agent;

preferably, the processing aid is selected from one or more of dioctyl phthalate, dibutyl phthalate, paraffin oil, and an aromatic hydrocarbon oil;

preferably, the inorganic dye is selected from one of titanium white, iron oxide red, iron oxide blue, iron oxide green, iron oxide yellow, and iron oxide violet;

preferably, the anti-aging agent is selected from one or more of anti-aging agent RD, anti-aging agent 4010NA, anti-aging agent 2246, and anti-aging agent AW;

preferably, the ultraviolet absorber is selected from one or more of ultraviolet absorber UV-P, ultraviolet absorber UVP-327, and ultraviolet absorber UV-326;

preferably, the crosslinking agent is selected from one or more of sulfur, p-benzoquinone dioxime, and zinc oxide;

preferably, the reaction-active auxiliary agent is selected from one or more of carboxylate, benzenesulfonate, lignosulfonate, and citrate.

Preferably, on the basis of the technical solution according to the present disclosure, the butyl rubber reactive bonding layer for a pre-applied reactive bonding waterproofing coiled material is prepared mainly from the following raw materials in parts by weight:

100 parts of raw rubber, 9.5 to 15.5 parts of a linear tackifier containing a hydroxyl-terminated structure, 1 to 5.5 parts of a terpene resin, 5 to 10 parts of a hydrocarbon resin, 50 to 150 parts of nano calcium carbonate, 12.5 to 19.5 parts of an active filler, 10 to 30 parts of a processing aid, 2 to 8 parts of an inorganic dye, 1 to 3 parts of an anti-aging agent, 1 to 3 parts of an ultraviolet absorber, 0.5 to 2 parts of a crosslinking agent, and 1 to 3 parts of a reaction-active auxiliary agent;

preferably, the butyl rubber reactive bonding layer for a pre-applied reactive bonding waterproofing coiled material is prepared mainly from the following raw materials in parts by weight: 100 parts of raw rubber, 11 to 15.5 parts of a linear tackifier containing a hydroxyl-terminated structure, 2 to 5.5 parts of a terpene resin, 6 to 10 parts of a hydrocarbon resin, 80 to 150 parts of nano calcium carbonate, 15 to 19.5 parts of an active filler, 10 to 20 parts of a processing aid, 3 to 8 parts of an inorganic dye, 1 to 2 parts of an anti-aging agent, 1 to 2 parts of an ultraviolet absorber, 0.5 to 1 part of a crosslinking agent, and 1 to 2 parts of a reaction-active auxiliary agent;

preferably, the butyl rubber reactive bonding layer for a pre-applied reactive bonding waterproofing coiled material is prepared mainly from the following raw materials in parts by weight: 100 parts of raw rubber, 13 to 15.5 parts of a linear tackifier containing a hydroxyl-terminated structure, 3 to 5.5 parts of a terpene resin, 8 to 10 parts of a hydrocarbon resin, 100 to 120 parts of nano calcium carbonate, 18 to 19.5 parts of an active filler, 15 to 20 parts of a processing aid, 3 to 6 parts of an inorganic dye, 1 to 1.5 parts of an anti-aging agent, 1 to 1.5 parts of an ultraviolet absorber, 0.5 to 1 part of a crosslinking agent, and 1 to 2 parts of a reaction-active auxiliary agent.

In a second aspect, a method for preparing the butyl rubber reactive bonding layer for a pre-applied reactive bonding waterproofing coiled material described above is provided, comprising the steps of:

(a) making, in accordance with a formulated weight, raw rubber as well as 50% to 60% of a formulated weight of a linear tackifier containing a hydroxyl-terminated structure, a formulated weight of an active filler, and optionally a terpene resin, a hydrocarbon resin, nano calcium carbonate, a processing aid, an inorganic dye, an anti-aging agent and an ultraviolet absorber to perform banburying; and (b) decreasing the temperature, and then making the obtained mixture and the rest of the linear tackifier containing a hydroxyl-terminated structure, and optionally a crosslinking agent and a reaction-active auxiliary agent to perform banburying, and molding the obtained mixture to obtain a butyl rubber reactive bonding layer.

Preferably, on the basis of the technical solution according to the present disclosure, in the step (a), the processing is performed at a temperature of 100 to 120° C., and the processing is performed for 5 to 8 min, and the banburying is performed for 8 to 10 min; and/or in the step (b), the temperature after being decreased is 60 to 80° C., and the banburying is performed for 4 to 5 min.

In a third aspect, a pre-applied reactive bonding waterproofing coiled material is provided, comprising the butyl rubber reactive bonding layer for a pre-applied reactive bonding waterproofing coiled material described above and a base film.

Compared with the prior art, the present disclosure has the following advantageous effects:

(1) The butyl rubber reactive bonding layer for a pre-applied reactive bonding waterproofing coiled material of the present disclosure comprises, as a main constituent having chemical reactive bonding activity, a linear tackifier containing a hydroxyl-terminated structure and an active filler. The active filler contains substances such as active silica and active alumina with a large specific surface area. The linear tackifier containing a hydroxyl-terminated structure undergoes hydrogen bonding with active silica and alumina in the active filler, so that the activity of the terminal hydroxyl groups with bonding properties are temporarily inhibited, which is macroscopically manifested as being non-sticky. When the pre-applied bonding layer is exposed to cement, the cement is hydrated to generate hydrated calcium silicate and calcium hydroxide, calcium hydroxide in turn reacts with silica and alumina in the active filler, and the active terminal hydroxyl groups of the linear tackifier containing a hydroxyl-terminated structure are released and chemically react with hydroxyl groups in the hydrated silicate and hydrated aluminate of the concrete to form ether bonds. Therefore, during the hydration of the cement, a macromolecular chain with active hydroxyl groups gradually chemically react with the hydrated silicate and hydrated aluminate at the concrete interface to finally generate a permanent chemical bond structure, so that a real skin-type waterproofing structure is formed between the butyl rubber reactive bonding layer and the concrete.

(2) The butyl rubber reactive bonding layer of the present disclosure comprises a linear tackifier containing a hydroxyl-terminated structure, which mainly serves the reactive bonding function. The active terminal hydroxyl groups thereof can form hydrogen bonds with silica and alumina in the active filler, and the released active terminal hydroxyl groups finally form a permanent chemical bond structure with the hydrated silicate and hydrated aluminate at the concrete interface, so that the butyl rubber reactive bonding layer does not macroscopically exhibit stickiness although it has the linear tackifier having an active hydroxyl-terminated structure. Moreover, the bonding layer obtained by the present disclosure has relatively high surface strength and hardness. Therefore, the butyl rubber reactive bonding layer of the present disclosure is non-sticky and allows people to walk thereon without being provided with an anti-sticking layer or isolation layer. The present disclosure simplifies the production process, saves costs, and also facilitates construction and application.

(3) The pre-applied waterproofing coiled material comprising the butyl rubber reactive bonding layer of the present disclosure is resistant to low temperature, does not tend to be embrittled, and has good bendability; and the pre-applied waterproofing coiled material has high thermal stability, does not flow, deform, and wrinkle at high temperature, and is adaptable to high-temperature construction environments, which widens the construction areas to which the pre-applied reactive bonding coiled material is applicable.

(4) The pre-applied waterproofing coiled material comprising the butyl rubber reactive bonding layer of the present disclosure has relatively high peel strength, has a peel strength of 4 to 6.5 N/mm from post-cast concrete, and has a peel strength of 4 to 5.6 N/mm from post-cast concrete immersed in water.

(5) In the method for preparing a butyl rubber reactive bonding layer of the present disclosure, a butyl rubber reactive bonding layer with a thickness of 0.5 to 4 mm is obtained by blending, banburying, and molding of the butyl raw rubber, the linear tackifier containing a hydroxyl-terminated structure and the active filler, which is finally hot-pressed and compounded with a base film to obtain a pre-applied reactive bonding waterproofing coiled material with a butyl rubber reactive bonding layer. The process is simple and suitable for batch processing and production.

BRIEF DESCRIPTION OF DRAWINGS

FIG. 1 is a schematic diagram showing the overall interface structure in which permanent chemical bonds are formed between a macromolecular chain with active hydroxyl groups in a butyl rubber reactive bonding layer and a concrete interface.

DETAILED DESCRIPTION OF EMBODIMENTS

Embodiments of the present disclosure will be described in detail below with reference to examples, but it will be understood by those skilled in the art that the following examples are merely intended to illustrate the present disclosure, and shall not be considered as limiting the scope of the present disclosure. Examples are carried out in accordance with conventional conditions or conditions recommended by the manufacturer, if no specific conditions are specified in the examples. Reagents or instruments used, whose manufacturers are not specified, are all conventional products that are available commercially.

According to a first aspect of the present disclosure, a butyl rubber reactive bonding layer for a pre-applied reactive bonding waterproofing coiled material is provided, which is prepared mainly from the following raw materials in parts by weight: 100 parts of raw rubber, 9.5 to 15.5 parts of a linear tackifier containing a hydroxyl-terminated structure, and 12.5 to 19.5 parts of an active filler; wherein the active filler comprises active silica and active alumina as constituents.

[Raw Rubber]

The raw rubber of the present disclosure refers to an unmodified or modified butyl rubber.

Butyl rubber is a kind of synthetic rubber, which is synthesized from isobutylene and a small amount of isoprene, and is used as a base constituent of the reactive bonding layer for a pre-applied reactive bonding waterproofing coiled material.

The raw rubber may be one or more of butyl rubber, brominated butyl rubber, and chlorinated butyl rubber.

The present disclosure is based on 100 parts by weight of raw rubber.

[Linear Tackifier Containing Hydroxyl-Terminated Structure]

The linear tackifier containing a hydroxyl-terminated structure according to the present disclosure refers to a thermoplastic tackifier having a terminal hydroxyl group in the main structure. The position of the hydroxyl group may be located at the end of the main chain or at the end of a side chain.

The tackifier refers to a small molecular compound that can improve the stickiness, especially surface stickiness, of rubber materials, including natural resins and synthetic resins. The types of the tackifiers are not limited in the present disclosure. Any tackifiers well known to those skilled in the art may be used, and modified tackifiers are also included, as long as they are thermoplastic tackifiers containing hydroxyl-terminated structures. Here, the thermoplastic resin may be understood as a resin that does not react and crosslink with butyl rubber.

A typical, but non-limited, example of a suitable linear tackifier containing a hydroxyl-terminated structure for use in the present disclosure is a linear phenolic resin.

Typical, but non-limited, parts by weight of the linear tackifier containing a hydroxyl-terminated structure are, for example, 9.5 parts, 10.5 parts, 11.5 parts, 12.5 parts, 13.5 parts, 14.5 parts, or 15.5 parts.

[Active Filler]

The active filler of the present disclosure comprises active silica and active alumina as constituents. It can be understood that the active filler used may be made directly of pure active silica, pure active alumina, and optionally other materials, or the active filler used is a common filler containing active silica and active alumina as constituents that is well known to those skilled in the art. Active silica and active alumina refer to amorphous silica and alumina having a relatively large specific surface area. The filler preferably used is an amorphous filler containing silica and alumina as active constituents.

Typical active fillers comprising silica and alumina constituents are, for example, fly ash, calcined kaolin and the like, and a typical active filler mainly comprising an alumina constituent is, for example, bauxite and the like.

Typical, but non-limited, parts by weight of the active filler are, for example, 12.5 parts, 13.5 parts, 14.5 parts, 15.5 parts, 16.5 parts, 17.5 parts, 18.5 parts or 19.5 parts.

The term "mainly from" described in the present disclosure means that it may comprise other components, for example a dye, an anti-aging agent, an ultraviolet absorber, and other auxiliary agents, in addition to the components described above, and these other components impart different characteristics to the butyl rubber reactive bonding layer. In addition, the term "mainly from" described in the present disclosure may also be replaced with a closed term "is" or "consisting of".

Currently, the adhesive layers of the polymeric waterproofing coiled materials commonly used are mostly hot-melt pressure-sensitive adhesive systems, which are characterized by tending to flow, deform, and wrinkle when exposed to heat, and tending to be embrittled at low temperature. Moreover, the adhesive layer must have a single anti-sticking layer or isolation layer so that the adhesive layer will not be sticky, otherwise the adhesive layer does not facilitate construction and cannot be easily bonded with the solidified concrete. Furthermore, the adhesive layer of the prior waterproofing coiled materials has low peel strength after it is bonded with post-cast concrete.

The butyl rubber reactive bonding layer of the present disclosure comprises a butyl rubber matrix, a linear tackifier containing a hydroxyl-terminated structure, and an active filler. The active filler contains active silica and active alumina as constituents. The linear tackifier containing a hydroxyl-terminated structure, acting as a main constituent having chemical reactive bonding activity, undergoes hydrogen bonding with silica and alumina in the active filler, so that the activity of the terminal hydroxyl groups can be temporarily inhibited. Moreover, the bonding layer obtained by the present disclosure has relatively high surface strength and hardness, so that the butyl rubber reactive bonding layer is not sticky and allows people to wall thereon without being provided with an anti-sticking layer or an isolation layer, which ensures easy subsequent construction.

When in use, when the pre-applied bonding layer is exposed to cement, the cement is hydrated to generate hydrated calcium silicate and calcium hydroxide, calcium hydroxide in turn reacts with silica and alumina in the active filler, and the active terminal hydroxyl groups of the linear tackifier containing a hydroxyl-terminated structure are released and chemically react with hydroxyl groups in the hydrated silicate and hydrated aluminate of the concrete to form ether bonds. Therefore, during the hydration of the cement, a macromolecular chain with active hydroxyl groups gradually chemically react with the hydrated silicate and hydrated aluminate at the concrete interface to finally generate a permanent chemical bond structure, so that a real skin-type waterproofing structure is formed between the butyl rubber reactive bonding layer and the concrete.

In combination with the above advantages, the reaction principle and advantages of the butyl rubber reactive bonding layer according to the present disclosure will be further explained by using a linear tackifier containing a hydroxyl-terminated structure having a typical structure as an example.

A typical linear tackifier containing a hydroxyl-terminated structure has the following chemical structure:

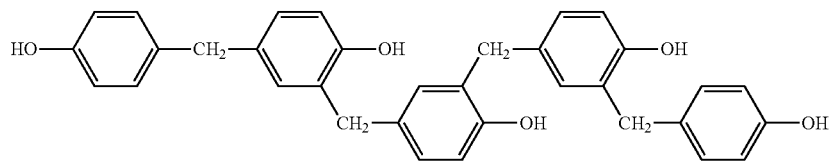 [SMILES: Oc1ccc(Cc2ccc(O)c(Cc3ccc(O)c(Cc4ccc(O)c(Cc5ccc(O)cc5)c4)c3)c2)cc1]

The main constituent of the active filler in the raw materials of the butyl rubber reactive bonding layer contains substances such as active silica and alumina with a large specific surface area. The active hydroxyl groups of the linear tackifier containing a hydroxyl-terminated structure that mainly serves a reactive bonding function in the raw materials undergo hydrogen bonding with silica and alumina in the active filler, so that the activity of the terminal hydroxyl groups can be temporarily inhibited, which is macroscopically manifested as being non-sticky.

The main constituent of concrete mortar is cement. When the butyl rubber reactive bonding layer is paved to the surface of cement, tricalcium silicate and dicalcium silicate which are the main constituents of cement are hydrated at room temperature, and hydrated calcium silicate and calcium hydroxide are generated by the reaction. The chemical reaction equations are shown below:

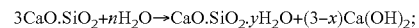

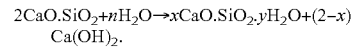

Calcium hydroxide produced during the hydration of cement reacts with silica and alumina. The reaction equations are shown below:

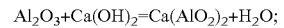

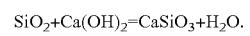

After calcium hydroxide reacts with silica and alumina, the active terminal hydroxyl groups are released and chemically react with hydroxyl groups in the hydrated silicate and hydrated aluminate of the concrete to form ether bonds. The reaction equation is shown using silicate as an example:

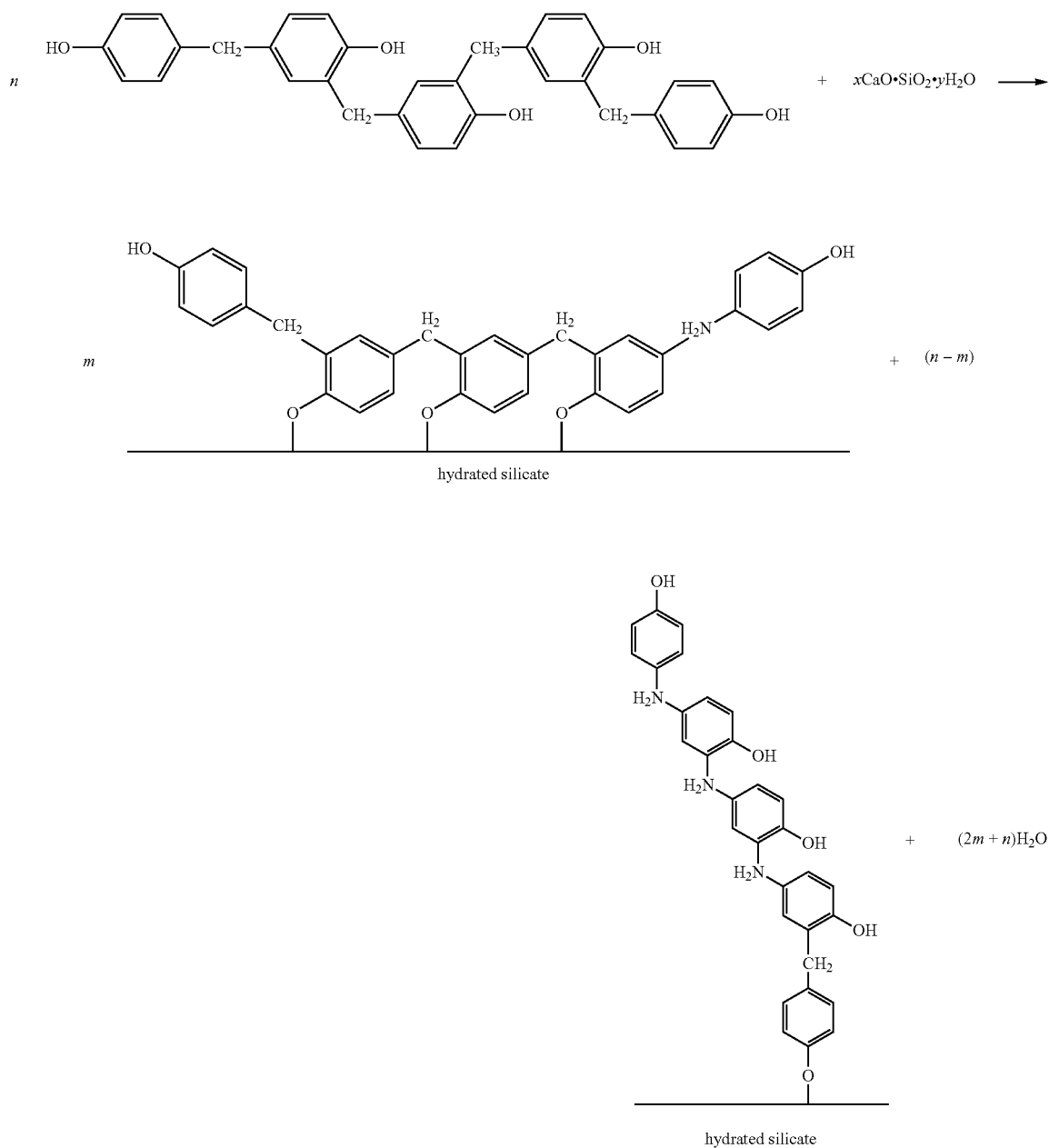

Therefore, during the hydration of cement, the macromolecular chain with active hydroxyl groups gradually chemically reacts with the hydrated silicate at the concrete interface to form a permanent chemical bond structure. The overall interface structure is shown in FIG. 1.

It can be seen that a real skin-type waterproofing structure can be formed between the butyl rubber reactive bonding layer of the present disclosure and concrete.

In addition, in the present disclosure, by the mutual synergistic cooperation between raw materials such as raw rubber, a linear tackifier containing a hydroxyl-terminated structure and an active filler, a pre-applied waterproofing coiled material comprising a butyl rubber reactive bonding layer obtained has good resistance to low and high temperatures, exhibits good bendability without tending to be embrittled at low temperature, and exhibits good thermal stability without flowing, deforming, and wrinkling at high temperature; and also, the coiled material has relatively high peel strength, which widens environments and fields of construction and application.

Preferably, the butyl rubber reactive bonding layer for a pre-applied reactive bonding waterproofing coiled material is prepared mainly from the following raw materials in parts by weight: 100 parts of raw rubber, 11 to 15.5 parts of a linear tackifier containing a hydroxyl-terminated structure, and 15 to 19.5 parts of an activity filler.

Further preferably, the butyl rubber reactive bonding layer for a pre-applied reactive bonding waterproofing coiled material is prepared mainly from the following raw materials in parts by weight: 100 parts of raw rubber, 13 to 15.5 parts of a linear tackifier containing a hydroxyl-terminated structure, and 18 to 19.5 parts of an active filler.

The comprehensive properties of the butyl rubber reactive bonding layer can be further improved by optimizing the content ratio between the respective raw material components.

In a preferred embodiment, the linear tackifier containing a hydroxyl-terminated structure is an unmodified or modified linear phenolic resin.

resins. The linear phenolic resin is preferably a linear alkyl phenolic resin.

The linear phenolic resin may be selected from one or more of commercially available A-1082G manufactured by Sumitomo Bakelite Co., Ltd., 29834K manufactured by Sumitomo Bakelite Co., Ltd., SP-1068 manufactured by SI Group, P7510P manufactured by SI Group, HRJ-10420 and CRJ-418 manufactured by SI Group, and SP-1077 manufactured by SI Group.

A typical, but non-limited, unmodified linear phenolic resin has, for example, the following chemical structure:

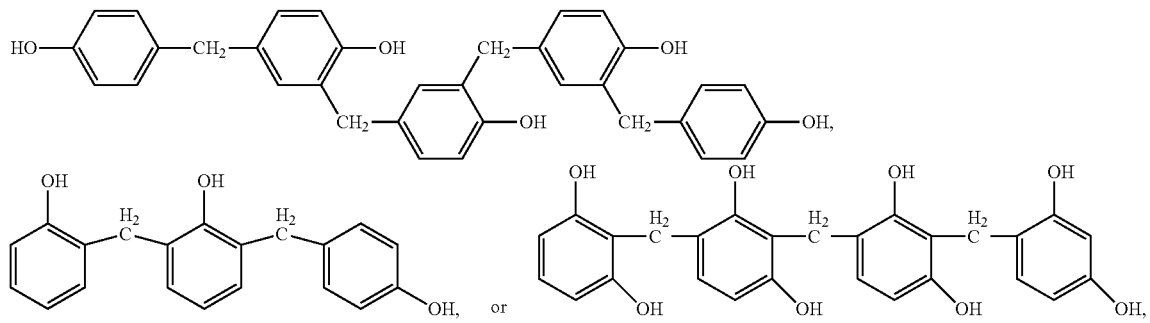

[Linear Phenolic Resin]

The linear phenolic resin is a thermoplastic phenolic resin prepared by polycondensation of excess phenolic compound with formaldehyde in the presence of an acidic catalyst.

Examples of the phenolic compound of the linear phenolic resin include: phenol, cresol, xylenol, butylmethylphenol, phenylphenol, biphenol, p-tert-butylphenol, p-tert-octylphenol, naphthol, bisphenol A, or bisphenol F. Examples of the aldehyde of the linear phenolic resin include: aliphatic aldehydes such as formaldehyde, acetaldehyde, butyraldehyde, or glyoxal; unsaturated aliphatic aldehydes such as acrolein; aromatic aldehydes such as benzaldehyde or hydroxybenzaldehyde; and unsaturated aromatic aldehydes such as cinnamaldehyde. The phenolic compounds and aldehydes described above may react to form linear phenolic resins.

An example of the linear phenol-aldehyde reaction is described as in the following reaction equation, in which the phenolic compound is resorcinol and the aldehyde is formaldehyde.

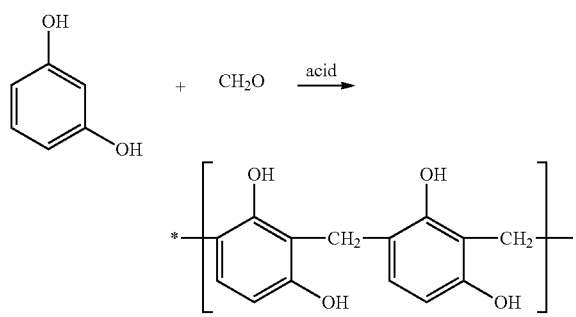

The linear phenolic resin of the present disclosure may be a thermoplastic phenolic resin capable of serving a tackifying function that is well known to those skilled in the art, including both unmodified and modified linear phenolic or the like.

Preferably, the modified linear phenolic resin is one or more of a rosin-modified linear phenolic resin, a polyamide-modified linear phenolic resin, an epoxy-modified linear phenolic resin, an organosilicon-modified linear phenolic resin, and a furan-modified linear phenolic resin.

A typical rosin-modified linear phenolic resin has the following chemical structure:

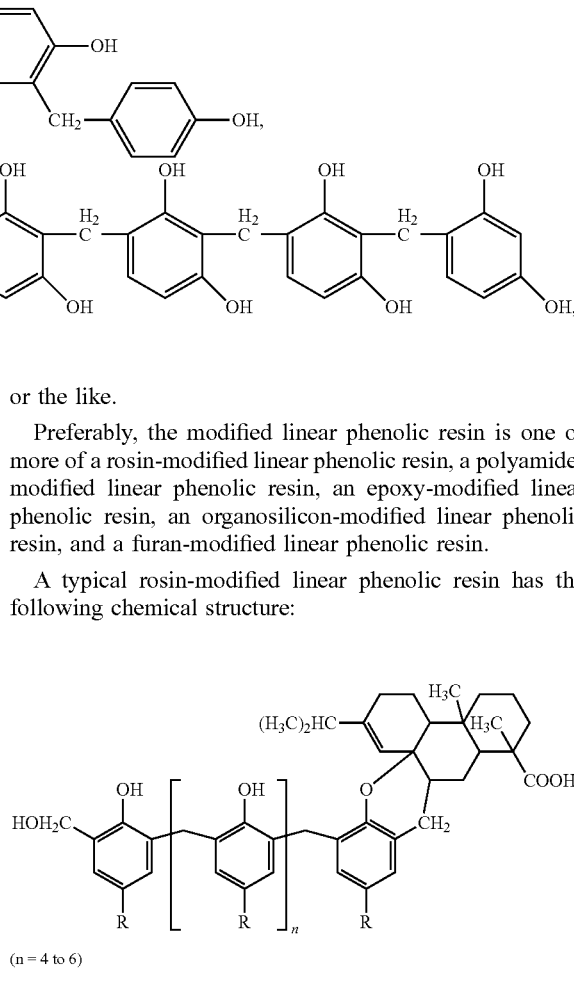

a typical polyamide-modified linear phenolic resin has the following chemical structure:

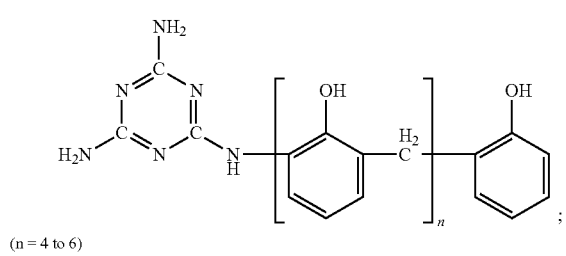

a typical epoxy-modified linear phenolic resin has the following chemical structure:

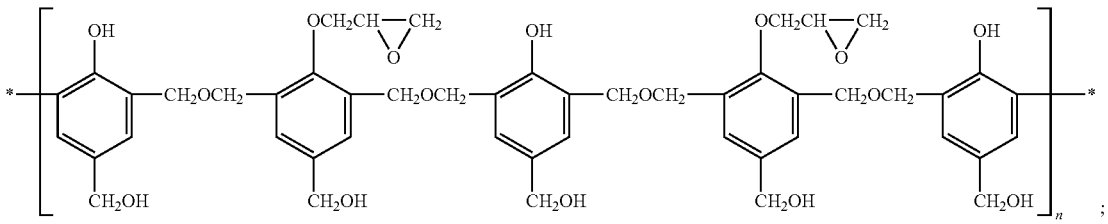

(n = 4 to 6)

a typical organosilicon-modified linear phenolic resin has the following chemical structure:

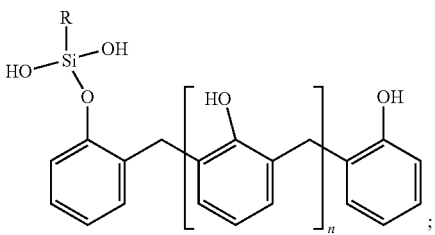

(n = 4 to 6)

a typical furan-modified linear phenolic resin has the following chemical structure:

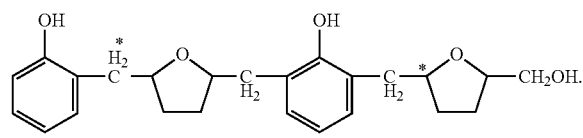

(n = 4 to 6)

The linear phenolic resin is a typical tackifier having a phenol structure and having active terminal hydroxyl groups, thus hydrogen bonds based on intermolecular force can be formed on the surface of the mixing rubber to achieve a tackifying effect. The free active hydroxyl groups undergo hydrogen bonding with active silica and alumina constituents in the active filler so that the surface of the butyl rubber reactive bonding layer is not sticky. Then, during the hydration of cement, the chain of the linear phenolic resin with active hydroxyl groups gradually chemically reacts with hydrated silicate and hydrated aluminate at the concrete interface to form a permanent chemical bond structure, so that a real skin-type waterproofing structure is formed between the pre-applied waterproofing coiled material and the concrete.

In a preferred embodiment, the active filler comprises bauxite, sodium carbonate, quicklime, fly ash, and calcined kaolin; wherein the total weight of bauxite, sodium carbonate, quicklime, and fly ash accounts for 65% to 75% of the weight of the active filler, and the weight of calcined kaolin accounts for 20% to 34% of the weight of the active filler.

Bauxite, which is also called beauxite or alumyte, comprises alumina as a main constituent. Fly ash is fine ash collected from flue gas obtained after combustion of coal, and fly ash is the main solid waste discharged from coal-fired power plants. Fly ash produced in the coal-fired power plants in China mainly includes the following oxide composition: $SiO_2$, $Al_2O_3$, FeO, $Fe_2O_3$, CaO, $TiO_2$, etc. A kaolin mineral is composed of kaolinite cluster minerals such as kaolinite, dickite, perlite, and halloysite, in which kaolinite is contained as a main mineral constituent, and kaolinite contains $SiO_2$ and $Al_2O_3$ constituents.

The total weight of bauxite, sodium carbonate, quicklime, and fly ash accounts for 65%, 70%, or 75% of the weight of the active filler; and the weight of calcined kaolin accounts for 20%, 22%, 25%, 28%, 30%, 32%, or 34% of the weight of the active filler.

It should be noted that the active filler comprising bauxite, sodium carbonate, quicklime, fly ash, and calcined kaolin refers to an active filler which may comprise other components in addition to bauxite, sodium carbonate, quicklime, fly ash, and calcined kaolin, in which a sum of the weight percentages of bauxite, sodium carbonate, quicklime, fly ash, calcined kaolin, and other components is 100%.

The components including bauxite, sodium carbonate, quicklime, fly ash, and calcined kaolin are used as the active filler. These components are easily obtainable, have low cost, and contain amorphous silica and alumina with a relatively large surface area in the constituents thereof. The mutual cooperation between the components allows the active filler to contain a lot of silica and alumina constituents having high activity and easily interacting and reacting with the active hydroxyl groups and other constituents.

In a preferred embodiment, the raw materials of the butyl rubber reactive bonding layer for a pre-applied reactive bonding waterproofing coiled material further comprise: 1 to 5.5 parts by weight of a terpene resin and/or 5 to 10 parts by weight of a hydrocarbon resin.

Terpene resins are some thermoplastic block copolymers, which have the advantages of light color, low odor, high hardness, high adhesion, good oxidation resistance and thermal stability, good compatibility and solubility, etc. Especially EVA-based, SIS-based, SBS-based, and other similar hot melt adhesives have excellent compatibility and weather resistance and excellent tackifying effect.

Typical, but non-limited, parts by weight of the terpene resin are, for example, 1 part, 1.5 parts, 2 parts, 2.5 parts, 3 parts, 3.5 parts, 4 parts, 4.5 parts, 5 parts, or 5.5 parts.

The hydrocarbon resin is a thermoplastic resin produced by C5 or C9 fraction, by-products of petroleum cracking, through processes such as pretreatment, polymerization, and distillation. It is not a macromolecular polymer, but an oligomer having a molecular weight between 300 and 3000.

Typical, but non-limited, parts by weight of the hydrocarbon resin are, for example, 5 parts, 6 parts, 7 parts, 8 parts, 9 parts, or 10 parts.

By adding 1 to 5.5 parts by weight of a terpene resin and 5 to 10 parts by weight of a hydrocarbon resin, the bonding effect between the raw materials can be increased, the bonding force between the butyl rubber reactive bonding layer and the concrete can be enhanced, and the peel strength of the butyl rubber reactive bonding layer from post-cast concrete can be further improved.

In a preferred embodiment, the raw materials of the butyl rubber reactive bonding layer for a pre-applied reactive bonding waterproofing coiled material further comprise: 10 to 30 parts by weight of a processing aid, 2 to 8 parts by weight of an inorganic dye, 1 to 3 parts by weight of an anti-aging agent, 1 to 3 parts by weight of an ultraviolet absorber, 0.5 to 2 parts by weight of a crosslinking agent, and/or 1 to 3 parts by weight of a reaction-active auxiliary agent.

Preferably, the processing aid is selected from one or more of dioctyl phthalate, dibutyl phthalate, paraffin oil, and an aromatic hydrocarbon oil.

Typical, but non-limited, parts by weight of the processing aid are, for example, 10 parts, 12 parts, 14 parts, 16 parts, 18 parts, 20 parts, 22 parts, 24 parts, 26 parts, 28 parts, or 30 parts.

Preferably, the inorganic dye is selected from one of titanium white, iron oxide red, iron oxide blue, iron oxide green, iron oxide yellow, and iron oxide violet.

Typical, but non-limited, parts by weight of the inorganic dye are, for example, 2 parts, 3 parts, 4 parts, 5 parts, 6 parts, 7 parts, or 8 parts.

The color of the butyl rubber reactive bonding layer is adjustable. Glossy and bright colored bonding layers with multiple colors can be fabricated by adding inorganic dyes of different colors, so that not only water leakage points can be easily identified, but also the requirements of different customers are met.

The anti-aging agent refers to a compounding agent capable of preventing or inhibiting deterioration of properties of a product due to factors such as oxygen, heat, light, ozone, mechanical stress and heavy metal ions, and extending the storage and service lifetime of the product.

Preferably, the anti-aging agent is selected from one or more of anti-aging agent RD, anti-aging agent 4010NA, anti-aging agent 2246, and anti-aging agent AW.

Typical, but non-limited, parts by weight of the anti-aging agent are, for example, 1 part, 1.5 parts, 2 parts, 2.5 parts, or 3 parts.

Preferably, the ultraviolet absorber is selected from one or more of ultraviolet absorber UV-P, ultraviolet absorber UVP-327, and ultraviolet absorber UV-326.

Typical, but non-limited, parts by weight of the ultraviolet absorber are, for example, 1 part, 1.5 parts, 2 parts, 2.5 parts, or 3 parts.

Preferably, the crosslinking agent is selected from one or more of sulfur, p-benzoquinone dioxime, and zinc oxide.

Typical, but non-limited, parts by weight of the crosslinking agent are, for example, 0.5 parts, 1 part, 1.5 parts, or 2 parts.

Preferably, the reaction-active auxiliary agent is selected from one or more of carboxylate, benzenesulfonate, lignosulfonate, and citrate.

Typical, but non-limited, parts by weight of the reaction-active auxiliary agent are, for example, 1 part, 1.5 parts, 2 parts, 2.5 parts, or 3 parts.

By adding certain parts by weight of the processing aid, the crosslinking agent, and the reaction-active auxiliary agent, the activity and bonding property of each raw material in the preparation process can be further enhanced, and the crosslinking between the respective constituents can be promoted, and thus the finally obtained butyl rubber reactive bonding layer has better comprehensive properties. By adding certain parts by weight of the anti-aging agent and the ultraviolet absorber, ultraviolet resistance and anti-aging properties are imparted to the butyl rubber reactive bonding layer, and the service lifetime of the reactive bonding layer is increased.

In a preferred embodiment, the raw materials of the butyl rubber reactive bonding layer for a pre-applied reactive bonding waterproofing coiled material further comprises: 50 to 150 parts by weight of nano calcium carbonate.

Compared with ordinary micron-level calcium carbonate, nano calcium carbonate has characteristics such as small size effect, surface effect, and quantum effect, and therefore can exhibit excellent properties not available in micron-level calcium carbonate. Nano calcium carbonate not only has a filling effect, but also has semi-reinforcing and reinforcing effects.

Typical, but non-limited, parts by weight of nano calcium carbonate are, for example, 50 parts, 60 parts, 70 parts, 80 parts, 90 parts, 100 parts, 110 parts, 120 parts, 130 parts, 140 parts, or 150 parts.

The butyl rubber reactive bonding layer elastomer can be reinforced by adding 50 to 150 parts by weight of nano calcium carbonate.

Preferably, a typical butyl rubber reactive bonding layer for a pre-applied reactive bonding waterproofing coiled material is prepared mainly from the following raw materials in parts by weight:

100 parts of raw rubber, 9.5 to 15.5 parts of a linear tackifier containing a hydroxyl-terminated structure, 1 to 5.5 parts of a terpene resin, 5 to 10 parts of a hydrocarbon resin, 50 to 150 parts of nano calcium carbonate, 12.5 to 19.5 parts of an active filler, 10 to 30 parts of a processing aid, 2 to 8 parts of an inorganic dye, 1 to 3 parts of an anti-aging agent, 1 to 3 parts of an ultraviolet absorber, 0.5 to 2 parts of a crosslinking agent, and 1 to 3 parts of a reaction-active auxiliary agent.

The typical butyl rubber reactive bonding layer comprises raw rubber, a linear tackifier containing a hydroxyl-terminated structure, and an active filler, as main constituents mainly functioning chemical reactive bonding activity, to which a terpene resin and a hydrocarbon resin are added for tackifying, nano calcium carbonate is added for reinforcement, a processing aid, a reaction-active auxiliary agent and a crosslinking agent are added to increase the reaction activity, an anti-aging agent and an ultraviolet absorber are added to increase its aging resistance, and different inorganic dyes are added to fabricate glossy and bright colored bonding layers. In this way, the obtained butyl rubber reactive bonding layer is not only non-sticky and resistant to low temperature and high temperature, but also has high peel strength and long service lifetime, and facilitates identification of water leakage points. It is a glossy and bright colored butyl rubber bonding layer which is non-flowable at high temperature, has good properties at low temperature, and allows people to walk thereon without being covered with sand and coating layers to ensure easy subsequent construction.

Preferably, the butyl rubber reactive bonding layer for a pre-applied reactive bonding waterproofing coiled material is prepared mainly from the following raw materials in parts by weight: 100 parts of raw rubber, 11 to 15.5 parts of a linear tackifier containing a hydroxyl-terminated structure, 2 to 5.5 parts of a terpene resin, 6 to 10 parts of a hydrocarbon resin, 80 to 150 parts of nano calcium carbonate, 15 to 19.5 parts of an active filler, 10 to 20 parts of a processing aid, 3 to 8 parts of an inorganic dye, 1 to 2 parts of an anti-aging agent, 1 to 2 parts of an ultraviolet absorber, 0.5 to 1 part of a crosslinking agent, and 1 to 2 parts of a reaction-active auxiliary agent.

Further preferably, the butyl rubber reactive bonding layer for a pre-applied reactive bonding waterproofing coiled material is prepared mainly from the following raw materials in parts by weight: 100 parts of raw rubber, 13 to 15.5 parts of a linear tackifier containing a hydroxyl-terminated structure, 3 to 5.5 parts of a terpene resin, 8 to 10 parts of a hydrocarbon resin, 100 to 120 parts of nano calcium carbonate, 18 to 19.5 parts of an active filler, 15 to 20 parts of a processing aid, 3 to 6 parts of an inorganic dye, 1 to 1.5 parts of an anti-aging agent, 1 to 1.5 parts of an ultraviolet absorber, 0.5 to 1 part of a crosslinking agent, and 1 to 2 parts of a reaction-active auxiliary agent.

The properties of the butyl rubber reactive bonding layer in various aspects can be further improved by optimizing the content ratio between the respective raw material components.

Preferably, the prepared butyl rubber reactive bonding layer for a pre-applied reactive bonding waterproofing coiled material has a thickness of 0.5 to 4 mm, for example, 0.5 mm, 1 mm, 2 mm, 3 mm, or 4 mm, so as to meet different usage requirements.

According to a second aspect of the present disclosure, a method for preparing the butyl rubber reactive bonding layer for a pre-applied reactive bonding waterproofing coiled material described above is provided, comprising the steps of:

(a) making, in accordance with a formulated weight, raw rubber as well as 50% to 60% of a formulated weight of a linear tackifier containing a hydroxyl-terminated structure, a formulated weight of an active filler, and optionally a terpene resin, a hydrocarbon resin, nano calcium carbonate, a processing aid, an inorganic dye, an anti-aging agent and an ultraviolet absorber to perform banburying; and (b) decreasing the temperature, and then making the obtained mixture and the rest of the linear tackifier containing a hydroxyl-terminated structure, and optionally a crosslinking agent and a reaction-active auxiliary agent to perform banburying, and molding the obtained mixture to obtain a butyl rubber reactive bonding layer.

The types and sources of the raw materials for preparing the butyl rubber reactive bonding layer are identical to those described in the above technical solution, and will not be described in detail here.

Preferably, before blending and banburying of the raw materials, the raw rubber is pre-processed, preferably processed at a temperature of 100 to 120° C. and a rotational speed of 50 to 80 r/min for 5 to 8 minutes.

Preferably, the processing, banburying, and blending may be performed in an internal mixer well known to those skilled in the art. After banburying, the materials are discharged and shaped in the form of a sheet. The materials may be discharged and shaped in the form of a sheet on an open mill, and may be extruded and molded by a rubber extruder.

In the present disclosure, the processed raw rubber undergoes blending and banburying with a linear tackifier containing a hydroxyl-terminated structure, an active filler, and other constituents, and then is extruded and molded to obtain a butyl rubber reactive bonding layer. The linear tackifier containing a hydroxyl-terminated structure is added in two batches, so that the respective raw materials can be mixed more sufficiently. The method involves a simple process and is suitable for batch processing and production.

Preferably, in the step (a), the processing is performed at a temperature of 100 to 120° C., and the processing is performed for 5 to 8 min, and the banburying is performed for 8 to 10 min.

In the step (a), the typical, but non-limited, processing temperature is, for example, 100° C., 110° C., or 120° C., the typical, but non-limited, processing time is, for example, 5 min, 6 min, 7 min, or 8 min, and the typical, but non-limited, banburying time is, for example, 8 min, 9 min, or 10 min.

Preferably, in the step (b), the temperature after being decreased is 60 to 80° C., and the banburying is performed for 4 to 5 min.

In the step (b), the typical, but non-limited, temperature after being decreased is 60° C., 70° C., or 80° C., and the typical, but non-limited, banburying time is, for example, 4 min, 4.5 min, or 5 min.

For unused raw materials, a better banburying effect can be obtained by controlling the temperature and time of the banburying.

A typical method for preparing a butyl rubber reactive bonding layer for a pre-applied reactive bonding waterproofing coiled material comprises the steps of:

(a) putting raw rubber in an internal mixer in accordance with a formulated weight, processing the raw rubber at a temperature of 100 to 120° C. and a rotational speed of 50 to 80 r/min for 5 to 8 min, and then alternately adding, in three times, formulated weights of a terpene resin, a hydrocarbon resin, nano calcium carbonate, an active filler, a processing aid, an inorganic dye, an anti-aging agent and an ultraviolet absorber as well as 50% to 60% of a formulated weight of a linear tackifier containing a hydroxyl-terminated structure, to perform banburying for 8 to 10 min until they are blended uniformly; and (b) decreasing the temperature to 60 to 80° C., adding the rest of the linear tackifier containing a hydroxyl-terminated structure, and a crosslinking agent and a reaction-active auxiliary agent to perform banburying for 4 to 5 min, and then discharging the materials, and then shaping the materials in the form of a sheet on an open mill, and extruding a butyl rubber reactive bonding layer with a thickness of 1.0 mm from a rubber extruder.

According to a third aspect of the present disclosure, a pre-applied reactive bonding waterproofing coiled material is provided, comprising the butyl rubber reactive bonding layer for a pre-applied reactive bonding waterproofing coiled material described above and a base film.

The base film to which the butyl rubber reactive bonding layer is applicable may be made of any of materials used as base films of polymeric pre-applied reactive bonding waterproofing coiled materials, such as plastics and rubbers including high-density polyethylene (HDPE), ethylene-vinyl acetate copolymer (EVA), ethylene-propylene-diene monomer (EPDM), thermoplastic polyolefin (TPO), etc.

As the pre-applied reactive bonding waterproofing coiled material, a pre-applied waterproofing coiled material with a butyl rubber reactive bonding layer may be formed by hot-pressing and compounding the butyl rubber reactive bonding layer and the base film by using a three-roll calender.

The pre-applied waterproofing coiled material of the present disclosure has the same advantages as the butyl rubber reactive bonding layer. The pre-applied waterproofing coiled material is tested to have good thermal stability, have an appearance without wrinkles, sliding, and flowing at a high temperature of 130° C., and have good bendability at low temperature without cracks or fractures at a low temperature of −35° C., which is higher than the national standard. The pre-applied waterproofing coiled material has high peel strength, has a peel strength of 4 to 6.5 N/mm from post-cast concrete, and has a peel strength of 4 to 5.6 N/mm from post-cast concrete immersed in water. The pre-applied waterproofing coiled material allows people to walk thereon without being covered with sand and coating layers, and the fabricated pre-applied waterproofing coiled material is adjustable in color and is glossy and bright, which facilitates identification of water leakage points.

In order to further understand the present disclosure, the method and effects of the present disclosure will be further described in detail below with reference to specific examples. Each raw material involved in the present disclosure is commercially available.

A description of raw materials used in the Examples and Comparative Examples is shown in Table 1.

TABLE 1

Description of Raw Materials Used in Examples and Comparative Examples

| Raw Materials | Description of Products |
|---|---|
| Polyamide-modified Linear Phenolic Resin | chemical structure: 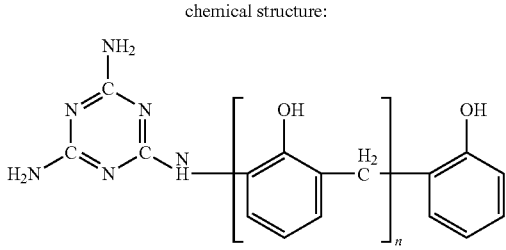 n = 4, purchase from SI Group |
| Epoxy-modified Linear Phenolic Resin | chemical structure: 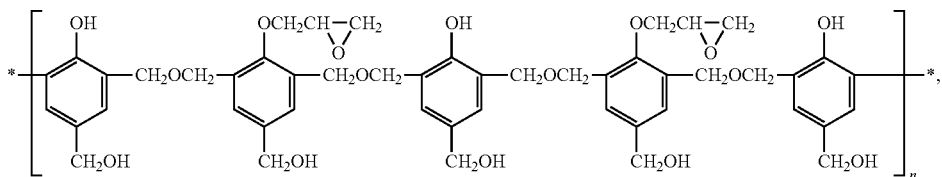 n = 4, purchased from SI Group |
| Rosin-modified Linear Phenolic Resin | chemical structure: 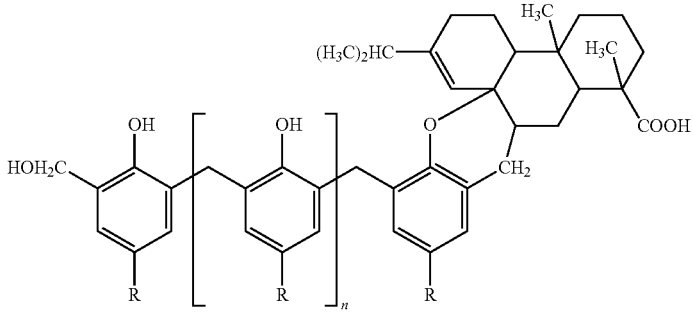 n = 4, purchased from SI Group |
| Organosilicon-modified Linear Phenolic Resin | chemical structure: 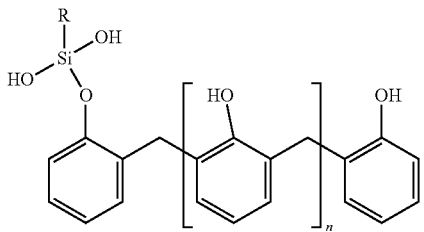 n = 4, purchased from SI Group |

TABLE 1-continued

Description of Raw Materials Used in Examples and Comparative Examples

| Raw Materials | Description of Products |
|---|---|
| Furan-modified Linear Phenolic Resin | chemical structure: [structure shown] n = 4, purchased from SI Group |
| Terpene Resin | purchase from Hubei Jusheng Technology Co., Ltd. |
| Hydrocarbon Resin | purchased from Henghe Materials & Science Technology Co., Ltd. |
| Active Filler | consisting of the following components in percentage by weight: 30% of bauxite, 10% of sodium carbonate, 5% of quicklime, 25% of fly ash, and 30% calcined kaolin |
| Unmodified Linear Phenolic Resin in Example 6 | chemical structure: [structure shown] obtained by polycondensation of formaldehyde and resorcinol in a ratio of 3:4 |
| Unmodified Linear Phenolic Resin in Example 7 | chemical structure: [structure shown] obtained by polycondensation of formaldehyde and phenyl in a ratio of 2:3 |

Example 1

A butyl rubber reactive bonding layer consisted of the following raw materials in parts by weight: 100 parts of butyl rubber, 9.5 parts of a polyamide-modified linear phenolic resin, 1 part of a terpene resin, 5 parts of a hydrocarbon resin, 50 parts of nano calcium carbonate, 12.5 parts of an active filler, 10 parts of dioctyl phthalate, 5 parts of titanium white, 1 part of an anti-aging agent RD, 1 part of an ultraviolet absorber UV-P, 0.5 parts of sulfur, and 1 part of sodium carboxylate.

Processing Procedures: butyl rubber was put in an internal mixer in accordance with the formulated weight and processed at a temperature of 105° C. and a rotational speed of 60 r/min for 5 min, and then the formulated weights of the terpene resin, the hydrocarbon resin, nano calcium carbonate, the active filler, dioctyl phthalate, titanium white, the anti-aging agent RD and the ultraviolet absorber UV-P as well as 60% of the formulated weight of the polyamide-modified linear phenolic resin were alternately added in three times to perform banburying for 10 min until they were blended uniformly; and the temperature was decreased to 70° C., 40% of the formulated weight of the polyamide-modified linear phenolic resin, and sulfur and sodium carboxylate were added to perform banburying for 4 min, and thereafter the materials were discharged and then shaped in the form of a sheet on an open mill, and a butyl rubber reactive bonding layer with a thickness of 1.0 mm was extruded from a rubber extruder and was hot-pressed and compounded with a HDPE base film by a three-roll calendar, to form a pre-applied waterproofing coiled material having a white butyl rubber reactive bonding layer.

Example 2

A butyl rubber reactive bonding layer consisted of the following raw materials in parts by weight: 60 parts of butyl rubber, 40 parts of brominated butyl rubber, 4.5 parts of a polyamide-modified linear phenolic resin, 6.5 parts of an epoxy-modified linear phenolic resin, 3 parts of a terpene resin, 6 parts of a hydrocarbon resin, 80 parts of nano calcium carbonate, 16 parts of an active filler, 20 parts of paraffin oil, 5 parts of iron oxide blue, 1 part of an anti-aging agent 4010NA, 1 part of an ultraviolent absorber UVP-327, 0.5 parts of p-benzoquinone dioxime, and 1 part of sodium citrate.

Processing Procedures: butyl rubber and brominated butyl rubber were put in an internal mixer in accordance with the formulated weights and processed at a temperature of 105° C. and a rotational speed of 60 r/min for 8 min, and then the formulated weights of the terpene resin, the hydrocarbon resin, nano calcium carbonate, the active filler, paraffin oil, iron oxide blue, the anti-aging agent 4010NA and the ultraviolet absorber UVP-327 as well as 60% of the formulated weight of the polyamide-modified linear phenolic resin and 60% of the formulated weight of the epoxy-modified linear phenolic resin were alternately added in three times to perform banburying for 8 min until they were blended uniformly; and the temperature was decreased to 60° C., 40% of the formulated weight of the polyamide-modified linear phenolic resin, 40% of the formulated weight of the epoxy-modified linear phenolic resin, and p-benzoquinone dioxime and sodium citrate were added to perform banburying for 5 min, and thereafter the materials were discharged and then shaped in the form of a sheet on an open mill, and a butyl rubber reactive bonding layer with a thickness of 1.0 mm was extruded from a rubber extruder and was hot-pressed and compounded with a TPO base film by a three-roll calendar, to form a pre-applied waterproofing coiled material having a blue butyl rubber reactive bonding layer.

Example 3

A butyl rubber reactive bonding layer consisted of the following raw materials in parts by weight: 60 parts of butyl rubber, 40 parts of chlorinated butyl rubber, 4.5 parts of a rosin-modified linear phenolic resin, 5 parts of a polyamide-modified linear phenolic resin, 6 parts of an organosilicon-modified linear phenolic resin, 5.5 parts of a terpene resin, 10 parts of a hydrocarbon resin, 150 parts of nano calcium carbonate, 19.5 parts of an active filler, 30 parts of an aromatic hydrocarbon oil, 5 parts of iron oxide violet, 1 part of an anti-aging agent 2246, 1 part of an ultraviolet absorber UV-326, 0.5 parts of zinc oxide, and 1 part of sodium lignosulfonate.

Processing Procedures: butyl rubber and chlorinated butyl rubber were put in an internal mixer in accordance with the formulated weights and processed at a temperature of 105° C. and a rotational speed of 60 r/min for 6 min, and then the formulated weights of the terpene resin, the hydrocarbon resin, nano calcium carbonate, the active filler, the aromatic hydrocarbon oil, iron oxide violet, the anti-aging agent 2246 and the ultraviolet absorber UV-326 as well as 60% of the formulated weight of the rosin-modified linear phenolic resin, 60% of the formulated weight of the organosilicon-modified linear phenolic resin, and 60% of the formulated weight of the polyamide-modified linear phenolic resin were alternately added in three times to perform banburying for 9 min until they were blended uniformly; and the temperature was decreased to 80° C., 40% of the formulated weight of the rosin-modified linear phenolic resin, 40% of the formulated weight of the organosilicon-modified linear phenolic resin, 40% of the formulated weight of the polyamide-modified linear phenolic resin, and zinc oxide and sodium lignosulfonate were added to perform banburying for 4.5 min, and thereafter the materials were discharged and then shaped in the form of a sheet on an open mill, and a butyl rubber reactive bonding layer with a thickness of 1.0 mm was extruded from a rubber extruder and was hot-pressed and compounded with a HDPE base film by a three-roll calendar, to form a pre-applied waterproofing coiled material having a purple butyl rubber reactive bonding layer.

Example 4

A butyl rubber reactive bonding layer consisted of the following raw materials in parts by weight: 100 parts of chlorinated butyl rubber, 5 parts of a polyamide-modified linear phenolic resin, 5 parts of a furan-modified linear phenolic resin, 4 parts of a terpene resin, 7 parts of a hydrocarbon resin, 120 parts of nano calcium carbonate, 14 parts of an active filler, 25 parts of dioctyl phthalate, 8 parts of iron oxide red, 2 parts of an anti-aging agent AW, 3 parts of an ultraviolet absorber UV-P, 2 parts of p-benzoquinone dioxime, and 2 parts of sodium benzenesulfonate.

Processing Procedures: chlorinated butyl rubber was put in an internal mixer in accordance with the formulated weight and processed at a temperature of 100° C. and a rotational speed of 80 r/min for 6 min, and then the formulated weights of the terpene resin, the hydrocarbon resin, nano calcium carbonate, the active filler, dioctyl phthalate, iron oxide red, the anti-aging agent AW and the ultraviolet absorber UV-P as well as 60% of the formulated weight of the polyamide-modified linear phenolic resin and 60% of the formulated weight of the furan-modified linear phenolic resin were alternately added in three times to perform banburying for 9 min until they were blended uniformly; and the temperature was decreased to 75° C., 40% of the formulated weight of the polyamide-modified linear phenolic resin, 40% of the formulated weight of the furan-modified linear phenolic resin, and p-benzoquinone dioxime and sodium benzenesulfonate were added to perform banburying for 4 min, and thereafter the materials were discharged and then shaped in the form of a sheet on an open mill, and a butyl rubber reactive bonding layer with a thickness of 1.0 mm was extruded from a rubber extruder and was hot-pressed and compounded with an EVA base film by a three-roll calendar, to form a pre-applied waterproofing coiled material having a red butyl rubber reactive bonding layer.

Example 5

A butyl rubber reactive bonding layer consisted of the following raw materials in parts by weight: 40 parts of butyl rubber, 30 parts of brominated butyl rubber, 30 parts of chlorinated butyl rubber, 13 parts of an organosilicon-modified linear phenolic resin, 5 parts of a terpene resin, 8 parts of a hydrocarbon resin, 100 parts of nano calcium carbonate, 18 parts of an active filler, 15 parts of dibutyl phthalate, 2 parts of iron oxide yellow, 3 parts of an anti-aging agent RD, 2 parts of an ultraviolet absorber UV-326, 1 part of sulfur, and 3 parts of sodium carboxylate.

Processing Procedures: butyl rubber, brominated butyl rubber, and chlorinated butyl rubber were put in an internal mixer in accordance with the formulated weights and processed at a temperature of 120° C. and a rotational speed of 50 r/min for 7 min, and then the formulated weights of the terpene resin, the hydrocarbon resin, nano calcium carbonate, the active filler, dibutyl phthalate, iron oxide yellow, the anti-aging agent RD and the ultraviolet absorber UV-326 as well as 60% of the formulated weight of the organosilicon-modified linear phenolic resin were alternately added in three times to perform banburying for 10 min until they were blended uniformly; and the temperature was decreased to 70° C., 40% of the formulated weight of the organosilicon-modified linear phenolic resin, and sulfur and sodium carboxylate were added to perform banburying for 5 min, and thereafter the materials were discharged and then shaped in the form of a sheet on an open mill, and a butyl rubber reactive bonding layer with a thickness of 1.0 mm was extruded from a rubber extruder and was hot-pressed and compounded with an EPDM base film by a three-roll calendar, to form a pre-applied waterproofing coiled material having a yellow butyl rubber reactive bonding layer.

Example 6

A butyl rubber reactive bonding layer was fabricated from the same raw materials by the same processing procedure steps as those in Example 1, except that the polyamide-modified linear phenolic resin was replaced with an unmodified linear phenolic resin formed by polycondensation of formaldehyde and resorcinol in a ratio of 3:4 and having a chemical structure as shown in Table 1.

Example 7

A butyl rubber reactive bonding layer was fabricated from the same raw materials by the same processing procedure steps as those in Example 1, except that the polyamide-modified linear phenolic resin was replaced with an unmodified linear phenolic resin formed by polycondensation of formaldehyde and phenol in a ratio of 2:3 and having a chemical structure as shown in Table 1.

Example 8

A butyl rubber reactive bonding layer was fabricated from the same raw materials by the same processing procedure steps as those in Example 2, except that the active filler was fly ash.

Example 9

A butyl rubber reactive bonding layer was fabricated from the same raw materials by the same processing procedure steps as those in Example 2, except that the active filler was calcined kaolin.

Example 10

A butyl rubber reactive bonding layer was fabricated from the same raw materials by the same processing procedure steps as those in Example 3, except that the terpene resin and the hydrocarbon resin were not contained in the raw materials.

Example 11

A butyl rubber reactive bonding layer was fabricated from the same raw materials by the same processing procedure steps as those in Example 4, except that nano calcium carbonate was not contained in the raw materials.

Example 12

A butyl rubber reactive bonding layer was fabricated from the same raw materials by the same processing procedure steps as those in Example 5, except that dibutyl phthalate, sodium carboxylate, and sulfur were not contained in the raw materials.

Example 13

A butyl rubber reactive bonding layer consisted of the following raw materials in parts by weight: 100 parts of butyl rubber, 9.5 parts of a polyamide-modified linear phenolic resin, and 12.5 parts of an active filler.

Processing Procedures: butyl rubber was put in an internal mixer in accordance with the formulated weight and processed at a temperature of 105° C. and a rotational speed of 60 r/min for 5 min, and then 60% of the formulated weight of the polyamide-modified linear phenolic resin and the active filler were added to perform banburying for 10 min until they were blended uniformly; and the temperature was decreased to 70° C., 40% of the formulated weight of the polyamide-modified linear phenolic resin was added to perform banburying for 4 min, and thereafter the materials were discharged and then shaped in the form of a sheet on an open mill, and a butyl rubber reactive bonding layer with a thickness of 1.0 mm was extruded from a rubber extruder and was hot-pressed and compounded with a HDPE base film by a three-roll calendar, to form a pre-applied waterproofing coiled material having a black butyl rubber reactive bonding layer.

Comparative Example 1

A butyl rubber reactive bonding layer was fabricated from the same raw materials by the same processing procedure steps as those in Example 1, except that the polyimide-modified linear phenolic resin was not contained in the raw materials.

Comparative Example 2

A butyl rubber reactive bonding layer was fabricated from the same raw materials by the same processing procedure steps as those in Example 1, except that the active filler was not contained in the raw materials.

Comparative Example 3

A butyl rubber reactive bonding layer was fabricated from the same raw materials by the same processing procedure steps as those in Example 2, except that the active filler was bauxite.

Comparative Example 4

A butyl rubber reactive bonding layer was fabricated from the same raw materials by the same processing procedure steps as those in Example 2, except that the active filler was active silica.

Comparative Example 5

A butyl rubber reactive bonding layer was fabricated from the same raw materials by the same processing procedures as those in Example 1, except that 5 parts by weight of the polyamide-modified linear phenolic resin and 30 parts by weight of the active filler were contained.

Comparative Example 6

A butyl rubber reactive bonding layer was fabricated from the same raw materials by the same processing procedures as those in Example 1, except that 30 parts by weight of the polyamide-modified linear phenolic resin and 5 parts by weight of the active filler were contained.

Comparative Example 7

A butyl rubber self-adhesive layer was fabricated as described in Patent No. CN 103102843 A.

Specifically, the butyl rubber self-adhesive layer comprised, in parts by weight: 20.0 parts of butyl rubber, 2.6 parts of an ethylene-vinyl acetate copolymer, 19.5 parts of a tackifier, 22.8 parts of a tackifier, 12.0 parts of carbon black, 12.0 parts of light calcium carbonate, 8.0 parts of a functional auxiliary agent, 1.8 parts of a vulcanizing agent, 0.8 parts of an anti-aging agent, and 0.5 parts of a coupling agent.

The processing procedures were carried out as follows: butyl rubber and the ethylene-vinyl acetate copolymer were put in a kneader and kneaded at a temperature of 120 to 140° C. for 15 to 20 min, the anti-aging agent, carbon black, light calcium carbonate, the tackifier, the functional auxiliary agent, and 80% of the total mass of the tackifier were alternately added in three batches and then kneaded for 35 to 45 min until they were blended uniformly, the temperature was decreased below 100° C., 20% of the total mass of the tackifier, and the vulcanizing agent and the coupling agent were added and kneaded for 15 to 20 min, and thereafter the materials were discharged and naturally cooled down, and then a butyl rubber self-adhesive layer with a thickness of 1 mm was extruded and molded from a wide extrusion molding machine and was hot-pressed and compounded with a HDPE base film by a three-roll calendar, to form a pre-applied waterproofing coiled material having a black butyl rubber self-adhesive layer.

Test Examples

Chemical, physical, and mechanical properties of the pre-applied waterproofing coiled materials with butyl rubber reactive bonding layer obtained in Examples 1 to 13 and Comparative Examples 1 to 7 were tested. The test methods were performed according to GB/T 23457-2009.

The test results were shown in Table 2.

TABLE 2

Test Results of Mechanical Properties of Pre-applied Waterproofing Coiled Materials Obtained in Examples and Comparative Examples

| | Items | | | | | | |
|---|---|---|---|---|---|---|---|
| | Peel Strength from Post-cast Concrete (N/mm) | | | | Peel Strength | | |
| Samples | Untreated | Surface Contaminated by Cement Powder | Surface Contaminated by Mud or Sand | Thermally Aged | from Post-cast Concrete Immersed in Water (N/mm) | Bendability at Low Temperature of −35° C. | Thermal Stability |
| GB/T23457-2009 | ≥2.0 | ≥1.5 | ≥1.5 | ≥1.5 | ≥1.5 | No crack or no fracture occurs at −25° C. | No wrinkle, sliding, or flowing occurs in the appearance when exposed to 70° C. for 2 h |
| Example 1 | 5.2 | 4.9 | 4.7 | 4.5 | 4.6 | No crack or no fracture occurs at −35° C. | No wrinkle, sliding, or flowing occurs in the appearance when exposed to 130° C. for 2 h |
| Example 2 | 5.4 | 5.2 | 4.8 | 4.7 | 5.0 | | |
| Example 3 | 6.3 | 5.7 | 5.9 | 5.3 | 5.6 | | |
| Example 4 | 5.8 | 5.3 | 5.1 | 4.8 | 5.2 | | |
| Example 5 | 5.6 | 5.5 | 5.4 | 5.1 | 5.1 | | |
| Example 6 | 5.0 | 4.6 | 4.4 | 4.2 | 4.1 | | |
| Example 7 | 4.9 | 4.7 | 4.5 | 4.3 | 4.3 | | |
| Example 8 | 5.2 | 5.0 | 4.5 | 4.4 | 4.8 | | |
| Example 9 | 5.3 | 5.0 | 4.6 | 4.5 | 4.9 | | |
| Example 10 | 6.3 | 5.7 | 5.9 | 5.3 | 5.6 | | |
| Example 11 | 5.8 | 5.3 | 5.1 | 4.8 | 5.2 | | |
| Example 12 | 5.6 | 5.5 | 5.4 | 5.1 | 5.1 | | |
| Example 13 | 5.2 | 4.9 | 4.7 | 4.5 | 4.6 | | |
| Comparative Example 1 | 4.1 | 4.9 | 4.7 | 4.5 | 4.6 | No crack or no fracture occurs at −25° C. | No wrinkle, sliding, or flowing occurs in the appearance when exposed to 90° C. for 2 h |
| Comparative Example 2 | 5.1 | 5.0 | 4.5 | 4.2 | 4.4 | No crack or no fracture occurs at −25° C. | No wrinkle, sliding, or flowing occurs in the appearance when exposed to 120° C. for 2 h |
| Comparative Example 3 | 5.2 | 5.0 | 4.5 | 4.6 | 4.7 | No crack or no fracture occurs at −25° C. | No wrinkle, sliding, or flowing occurs in the appearance when exposed to 100° C. for 2 h |

TABLE 2-continued

Test Results of Mechanical Properties of Pre-applied Waterproofing Coiled Materials Obtained in Examples and Comparative Examples

| | Items | | | | | | |
|---|---|---|---|---|---|---|---|
| | Peel Strength from Post-cast Concrete (N/mm) | | | | Peel Strength | | |
| Samples | Untreated | Surface Contaminated by Cement Powder | Surface Contaminated by Mud or Sand | Thermally Aged | from Post-cast Concrete Immersed in Water (N/mm) | Bendability at Low Temperature of −35° C. | Thermal Stability |
| Comparative Example 4 | 5.3 | 5.1 | 4.6 | 4.5 | 4.8 | No crack or no fracture occurs at −25° C. | No wrinkle, sliding, or flowing occurs in the appearance when exposed to 100° C. for 2 h |
| Comparative Example 5 | 4.5 | 4.1 | 4.0 | 3.8 | 3.9 | No crack or no fracture occurs at −25° C. | No wrinkle, sliding, or flowing occurs in the appearance when exposed to 90° C. for 2 h |
| Comparative Example 6 | 4.3 | 4.2 | 4.3 | 4.1 | 4.1 | No crack or no fracture occurs at −25° C. | No wrinkle, sliding, or flowing occurs in the appearance when exposed to 100° C. for 2 h |
| Comparative Example 7 | 2.1 | 1.8 | 1.6 | 1.5 | 1.6 | No crack or no fracture occurs at −25° C. | No wrinkle, sliding, or flowing occurs in the appearance when exposed to 70° C. for 2 h |

It can be seen from Table 2 that the pre-applied waterproofing coiled material comprising the butyl rubber reactive bonding layer of the present disclosure has a good bonding property and can form permanent chemical bonds with concrete, has high surface hardness and strength, is not sticky and allows people to walk thereon without being covered with sand and coating layers, and can be made into a glossy and bright pre-applied waterproofing coiled material with different colors, which facilitates identification of water leakage points. The pre-applied waterproofing coiled material is tested to have good thermal stability, which has an appearance without wrinkles, sliding, and flowing at a high temperature of 130° C., and have good bendability at low temperature, which has no crack or fracture at a low temperature of −35° C., which was higher than the national standard. The pre-applied waterproofing coiled material has high peel strength, has a peel strength of 4 to 6.5 N/mm from post-cast concrete, and has a peel strength of 4 to 5.6 N/mm from post-cast concrete immersed in water.

Comparing Example 1 with Examples 6-7, a polyamide-modified linear phenolic resin is used in Example 1, and an unmodified linear phenolic resin is used in Examples 6-7. The obtained pre-applied waterproofing coiled materials have different peel strengths from concrete, and the pre-applied waterproofing coiled material obtained by using the modified linear phenolic resin has higher peel strength from concrete than the pre-applied waterproofing coiled material obtained by using the unmodified linear phenolic resin.

Comparing Example 2 with Examples 8-9, an active filler consisting of 30% of bauxite, 10% of sodium carbonate, 5% of quicklime, 25% of fly ash, and 30% of calcined kaolin is used in Example 2, fly ash is used as the active filler in Example 8, and calcined kaolin is used as the active filler in Example 9. As a result, it is found that the pre-applied waterproofing coiled material obtained by using the active filler of Example 2 has a stronger bonding property and higher peel strength than the pre-applied waterproofing coiled materials obtained by using the active fillers of Examples 8-9. This is because the active filler consisting of bauxite, sodium carbonate, quicklime, fly ash, and calcined kaolin has highly active silica and alumina, which can fully interact with calcium hydroxide generated during hydration of cement, so as to release active terminal hydroxyl groups from the bonding layer, so that more permanent chemical bonds are formed between a macromolecular chain with the active terminal hydroxyl groups and the concrete interface.

Example 10 does not contain a terpene resin and a hydrocarbon resin in the raw materials as compared with Example 3, Example 11 does not contain nano calcium carbonate in the raw materials as compared with Example 4, Example 12 does not contain dibutyl phthalate, sodium carboxylate, and sulfur (a crosslinking agent) in the raw materials as compared with Example 5, and the butyl rubber reactive bonding layer of Example 13 was fabricated from butyl rubber, a polyamide-modified linear phenolic resin, and an active filler. As a result, it is found that the pre-applied waterproofing coiled materials obtained in Examples 1 and 3-5 have better comprehensive properties than those of the pre-applied waterproofing coiled materials obtained in Examples 13 and 10-12. Thus, it can be seen that the comprehensive properties of the pre-applied waterproofing coiled material can be further improved by adding different raw materials such as a tackifier, nano calcium carbonate, and other auxiliary agents on the basis of butyl rubber, the linear tackifier containing a hydroxyl-terminated structure, and the active filler. Also, in Examples 1-12, colored bonding layers with different colors are fabricated by adding inorganic dyes with different colors, which allow easier identification of water leakage points and are more beautiful than the conventional black adhesive layer.

Compared with Example 1, in Comparative Example 1, the raw materials do not contain a polyamide-modified linear phenolic resin, and the obtained pre-applied waterproofing coiled material has low peel strength from concrete. Compared with Example 1, in Comparative Example 2, the raw materials do not contain an active filler, and the obtained butyl rubber reactive bonding layer is sticky and does not allow people to walk thereon directly. This is because if the raw materials do not contain a linear tackifier with a hydroxyl-terminated structure, the pre-applied waterproofing coiled material cannot chemically react with concrete to form permanent chemical bonds and thus have a poor bonding property, and if the raw materials do not contain silica and alumina as active constituents, the hydroxyl-terminated structure with bonding activity cannot be inhibited so that the pre-applied waterproofing coiled material is sticky. In addition, the pre-applied waterproofing coiled materials obtained in Comparative Example 1 and Comparative Example 2 also show a reduction in resistance to low and high temperatures.

Compared with Example 2, in Comparative Example 3, the active filler is bauxite (comprising alumina as the main constituent), and there is no active silica. Compared with Example 2, in Comparative Example 4, the active filler is active silica, and there is no alumina. As a result, it is found that the pre-applied waterproofing coiled material obtained by using a filler comprising both alumina and silica as active constituents has better peel strength from concrete and better resistance to low and high temperatures than those of the pre-applied waterproofing coiled material obtained by using a filler comprising only a single active constituent. This is because hydroxyl groups of both silicate and aluminate can react with active hydroxyl groups, and the macromolecular chain with active hydroxyl groups can form more and more stable permanent chemical bonds with the concrete interface so that the obtained pre-applied waterproofing coiled material has better properties. In addition, a pre-applied waterproofing coiled material obtained by adding a filler having alumina as active constituent has a smoother surface.

Compared with Example 1, in Comparative Example 5, the raw materials comprise less parts of a linear tackifier containing a hydroxyl-terminated structure and more parts of an active filler, and the obtained pre-applied waterproofing coiled material shows a reduction in chemical and physical properties. This is because less parts of a linear tackifier containing a hydroxyl-terminated structure cannot interact with the active constituents in the filler and the silicate and aluminate generated during hydration of cement, to form permanent chemical bonds, so that the obtained pre-applied waterproofing coiled material shows reduced peel strength from concrete, and also shows reduced resistance to low and high temperatures.

Compared with Example 1, in Comparative Example 6, the raw materials comprise more parts of a linear tackifier containing a hydroxyl-terminated structure and less parts of an active filler, and the obtained pre-applied waterproofing coiled material shows a reduction in chemical and physical properties and is slightly sticky. This is because less parts of an active filler have less silica and alumina as active constituents, which cannot well inhibit active hydroxyl groups that produce a bonding effect and cannot well react with calcium hydroxide produced during hydration of cement to release active terminal hydroxyl groups to form permanent chemical bonds between the terminal hydroxyl groups and the concrete interface.

The properties of the butyl rubber self-adhesive layer obtained from Patent No. CN 103102843 A in Comparative Example 7 are tested and compared with the properties of the butyl rubber reactive bonding layer of the present disclosure. It can be seen that the butyl rubber reactive bonding layer of the present disclosure shows significantly better peel strength from post-cast concrete, resistance to low temperature, and thermal stability than those in Patent No. CN 103102843 A. The effects obtained in CN 103102843 A can merely meet the requirements of GB/T23457-2009. The properties of the butyl rubber reaction bonding layer of the present disclosure are significantly higher than those required in GB/T23457-2009. Moreover, the butyl rubber reactive bonding layer of the present disclosure is non-sticky and allows people to walk thereon without being covered with sand and coating layers. In contrast, the butyl rubber self-adhesive layer in Patent No. CN 103102843 A cannot achieve this effect. Hence, the present disclosure has significant advantages.

Although the present disclosure has been illustrated and described with specific examples, it should be appreciated that many other changes and modifications can be made without departing from the spirit and scope of the present disclosure. It is therefore intended to cover in the appended claims all such changes and modifications that are within the scope of the present disclosure.

What is claimed is:

1. A butyl rubber reactive bonding layer for a pre-applied reactive bonding waterproofing coiled material, wherein the butyl rubber reactive bonding layer is prepared mainly from following raw materials in parts by weight: 100 parts of a raw rubber, 9.5 to 15.5 parts of a linear tackifier containing a hydroxyl-terminated structure, and 12.5 to 19.5 parts of an active filler,
   wherein the active filler comprises active silica and active alumina as constituents.

2. The butyl rubber reactive bonding layer for a pre-applied reactive bonding waterproofing coiled material according to claim 1, wherein the butyl rubber reactive bonding layer is prepared mainly from the following raw materials in parts by weight: 100 parts of the raw rubber, 11 to 15.5 parts of the linear tackifier containing a hydroxyl-terminated structure, and 15 to 19.5 parts of the activity filler.

3. The butyl rubber reactive bonding layer for a pre-applied reactive bonding waterproofing coiled material according to claim 1, wherein the linear tackifier containing a hydroxyl-terminated structure is an unmodified or modified linear phenolic resin.

4. The butyl rubber reactive bonding layer for a pre-applied reactive bonding waterproofing coiled material according to claim 1, wherein the active filler comprises bauxite, sodium carbonate, quicklime, fly ash, and calcined kaolin,
   wherein a total weight of bauxite, sodium carbonate, quicklime, and fly ash accounts for 65% to 75% of a weight of the active filler, and a weight of calcined kaolin accounts for 20% to 34% of the weight of the active filler.

5. The butyl rubber reactive bonding layer for a pre-applied reactive bonding waterproofing coiled material according to claim 1, wherein the raw materials of the butyl rubber reactive bonding layer for the pre-applied reactive bonding waterproofing coiled material further comprise, by weight, 1 to 5.5 parts of a terpene resin and/or 5 to 10 parts of a hydrocarbon resin.

6. The butyl rubber reactive bonding layer for a pre-applied reactive bonding waterproofing coiled material according to claim 1, wherein the raw materials of the butyl rubber reactive bonding layer for the pre-applied reactive bonding waterproofing coiled material further comprise, by weight, 10 to 30 parts of a processing aid, 2 to 8 parts of an inorganic dye, 1 to 3 parts of an anti-aging agent, 1 to 3 parts of an ultraviolet absorber, 0.5 to 2 parts of a crosslinking agent, and/or 1 to 3 parts of a reaction-active auxiliary agent.

7. The butyl rubber reactive bonding layer for a pre-applied reactive bonding waterproofing coiled material according to claim 1, wherein the butyl rubber reactive bonding layer is prepared mainly from following raw materials in parts by weight:

100 parts of the raw rubber, 9.5 to 15.5 parts of the linear tackifier containing a hydroxyl-terminated structure, 1 to 5.5 parts of a terpene resin, 5 to 10 parts of a hydrocarbon resin, 50 to 150 parts of nano calcium carbonate, 12.5 to 19.5 parts of the active filler, 10 to 30 parts of a processing aid, 2 to 8 parts of an inorganic dye, 1 to 3 parts of an anti-aging agent, 1 to 3 parts of an ultraviolet absorber, 0.5 to 2 parts of a crosslinking agent, and 1 to 3 parts of a reaction-active auxiliary agent.

8. A method for preparing the butyl rubber reactive bonding layer for a pre-applied reactive bonding waterproofing coiled material according to claim 1, comprising following steps:
  (a) making, in accordance with a formulated weight, the raw rubber as well as 50% to 60% of a formulated weight of the linear tackifier containing a hydroxyl-terminated structure, a formulated weight of the active filler, and optionally the terpene resin, the hydrocarbon resin, nano calcium carbonate, the processing aid, the inorganic dye, the anti-aging agent and the ultraviolet absorber to perform banburying; and
  (b) decreasing a temperature, and then making an obtained mixture and a rest of the linear tackifier containing a hydroxyl-terminated structure, and optionally the crosslinking agent and the reaction-active auxiliary agent to perform banburying, and molding an obtained mixture to obtain the butyl rubber reactive bonding layer.

9. The method for preparing the butyl rubber reactive bonding layer for a pre-applied reactive bonding waterproofing coiled material according to claim 8, wherein in the step (a), a processing is performed at a temperature of 100 to 120° C., the processing is performed for 5 to 8 min, and the banburying is performed for 8 to 10 min, and/or
  in the step (b), the temperature after being decreased is 60 to 80° C., and the banburying is performed for 4 to 5 min.

10. A pre-applied reactive bonding waterproofing coiled material, comprising the butyl rubber reactive bonding layer for a pre-applied reactive bonding waterproofing coiled material according to claim 1 and a base film.

11. The butyl rubber reactive bonding layer for a pre-applied reactive bonding waterproofing coiled material according to claim 2, wherein the butyl rubber reactive bonding layer for the pre-applied reactive bonding waterproofing coiled material is prepared mainly from the following raw materials in parts by weight: 100 parts of the raw rubber, 13 to 15.5 parts of the linear tackifier containing a hydroxyl-terminated structure, and 18 to 19.5 parts of the active filler.

12. The butyl rubber reactive bonding layer for a pre-applied reactive bonding waterproofing coiled material according to claim 3, wherein the modified linear phenolic resin is one or more selected from the group consisting of a rosin-modified linear phenolic resin, a polyamide-modified linear phenolic resin, an epoxy-modified linear phenolic resin, an organosilicon-modified linear phenolic resin, and a furan-modified linear phenolic resin.

13. The butyl rubber reactive bonding layer for a pre-applied reactive bonding waterproofing coiled material according to claim 6, wherein the processing aid is one or more selected from the group consisting of dioctyl phthalate, dibutyl phthalate, paraffin oil, and an aromatic hydrocarbon oil.

14. The butyl rubber reactive bonding layer for a pre-applied reactive bonding waterproofing coiled material according to claim 6, wherein the inorganic dye is one selected from the group consisting of titanium white, iron oxide red, iron oxide blue, iron oxide green, iron oxide yellow, and iron oxide violet.

15. The butyl rubber reactive bonding layer for a pre-applied reactive bonding waterproofing coiled material according to claim 6, wherein the anti-aging agent is one or more selected from the group consisting of anti-aging agent RD, anti-aging agent 4010NA, anti-aging agent 2246, and anti-aging agent AW.

16. The butyl rubber reactive bonding layer for a pre-applied reactive bonding waterproofing coiled material according to claim 6, wherein the ultraviolet absorber is one or more selected from the group consisting of ultraviolet absorber UV-P, ultraviolet absorber UVP-327, and ultraviolet absorber UV-326.

17. The butyl rubber reactive bonding layer for a pre-applied reactive bonding waterproofing coiled material according to claim 6, wherein the crosslinking agent is one or more selected from the group consisting of sulfur, p-benzoquinone dioxime, and zinc oxide.

18. The butyl rubber reactive bonding layer for a pre-applied reactive bonding waterproofing coiled material according to claim 6, wherein the reaction-active auxiliary agent is one or more selected from the group consisting of carboxylate, benzenesulfonate, lignosulfonate, and citrate.

19. The butyl rubber reactive bonding layer for a pre-applied reactive bonding waterproofing coiled material according to claim 7, wherein the butyl rubber reactive bonding layer for the pre-applied reactive bonding waterproofing coiled material is prepared mainly from the following raw materials in parts by weight: 100 parts of the raw rubber, 11 to 15.5 parts of the linear tackifier containing a hydroxyl-terminated structure, 2 to 5.5 parts of the terpene resin, 6 to 10 parts of the hydrocarbon resin, 80 to 150 parts of nano calcium carbonate, 15 to 19.5 parts of the active filler, 10 to 20 parts of the processing aid, 3 to 8 parts of the inorganic dye, 1 to 2 parts of the anti-aging agent, 1 to 2 parts of the ultraviolet absorber, 0.5 to 1 part of the crosslinking agent, and 1 to 2 parts of the reaction-active auxiliary agent.

20. The butyl rubber reactive bonding layer for a pre-applied reactive bonding waterproofing coiled material according to claim 7, wherein the butyl rubber reactive bonding layer for the pre-applied reactive bonding waterproofing coiled material is prepared mainly from the following raw materials in parts by weight: 100 parts of the raw rubber, 13 to 15.5 parts of the linear tackifier containing a hydroxyl-terminated structure, 3 to 5.5 parts of the terpene resin, 8 to 10 parts of the hydrocarbon resin, 100 to 120 parts of nano calcium carbonate, 18 to 19.5 parts of the active filler, 15 to 20 parts of the processing aid, 3 to 6 parts of the inorganic dye, 1 to 1.5 parts of the anti-aging agent, 1 to 1.5 parts of the ultraviolet absorber, 0.5 to 1 part of the cross-linking agent, and 1 to 2 parts of the reaction-active auxiliary agent.

* * * * *